(12) United States Patent
Chang

(10) Patent No.: US 11,254,161 B2
(45) Date of Patent: Feb. 22, 2022

(54) WHEEL

(71) Applicant: Inhan Chang, Suwon-si (KR)

(72) Inventor: Inhan Chang, Suwon-si (KR)

(*) Notice: Subject to any disclaimer, the term of this patent is extended or adjusted under 35 U.S.C. 154(b) by 189 days.

(21) Appl. No.: 16/617,555

(22) PCT Filed: Apr. 26, 2018

(86) PCT No.: PCT/KR2018/004821
§ 371 (c)(1),
(2) Date: Nov. 27, 2019

(87) PCT Pub. No.: WO2018/230835
PCT Pub. Date: Dec. 20, 2018

(65) Prior Publication Data
US 2020/0156406 A1    May 21, 2020

(30) Foreign Application Priority Data

Jun. 15, 2017     (KR) ........................ 10-2017-0075650

(51) Int. Cl.
*B60B 15/00*     (2006.01)
*B60B 19/00*     (2006.01)

(52) U.S. Cl.
CPC .............. *B60B 15/00* (2013.01); *B60B 19/00* (2013.01); *B60B 2900/551* (2013.01)

(58) Field of Classification Search
CPC ....... B60B 15/00; B60B 15/02; B60B 15/028; B60B 15/06; B60B 15/12; B60B 15/18;
(Continued)

(56) References Cited

U.S. PATENT DOCUMENTS 1,077,076 A * 10/1913 Huffman ................. B60B 15/02
301/45
1,155,704 A * 10/1915 Coulter ................... B60B 15/18
305/2

(Continued)

FOREIGN PATENT DOCUMENTS

EP           0116733 A1    8/1984
JP          2007-185761 A    7/2007
JP          2010-264923 A    11/2010

*Primary Examiner* — Jason R Bellinger
*Assistant Examiner* — Emily G Castonguay
(74) *Attorney, Agent, or Firm* — Novick, Kim & Lee, PLLC; Sang Ho Lee; Hyun Woo Shin

(57) ABSTRACT

A wheel includes a body (10) having a cylindrical outer circumference; a first ring member (21) provided at one side edge of the body (10) in the form of a protruding ring; a second ring member (22) provided at the other side edge of the body (10) in the form of a protruding ring; a rotation ring (30) located between the first ring member (21) and the second ring member (22) and located out of the body (10) and rotatably coupled thereto; a plurality of pivoting plates (40) coupled to the rotation ring (30) to be pivotal outward and configured to protrude out of the rotation ring (30); a connection member (50) located between the plurality of pivoting plates (40) to connect the first ring member (21) and the second ring member (22) and serve as a stopper for limiting a pivoting range of the pivoting plate (40); a first opening (31) formed at the rotation ring (30) along a rotation direction of the rotation ring (30); a second opening (11) formed at the body (10) at a position corresponding to the first opening (31); a stopper bar (60) configured to be pivotal based on a center portion (C) of the body (10) and provided through the first opening (31) and the second opening (11); and a shock absorber (70) coupled to the body (10) to absorb shock when the stopper bar (60) pivots.

1 Claim, 4 Drawing Sheets

(58) Field of Classification Search
CPC ........... B60B 15/26; B60B 9/00; B60B 19/00; B60B 2900/551
See application file for complete search history.

(56) References Cited

U.S. PATENT DOCUMENTS

| | | | |
|---|---|---|---|
| 1,408,885 A * | 3/1922 | Humphrey | B60B 15/06 301/46 |
| 8,127,810 B2 | 3/2012 | Wichern | |
| 9,399,370 B2 | 7/2016 | Kemeny | |

* cited by examiner

WHEEL

TECHNICAL FIELD

The present disclosure relates to a wheel that allows a vehicle to run smoothly on high slopes, sand hills and swamps.

BACKGROUND ART

A conventional vehicle wheel is prepared by coupling a rubber tire to a metal wheel. For military use, caterpillar wheels are used for tanks. A rubber tire is suitable for use on paved roads, but the rubber tire becomes slippery or bogged down on unpaved roads such as sand and swamps, which makes driving difficult.

A caterpillar wheel is suitable for combat since it is useable in areas such as sand or swamp, or in mountainous areas. However, if the caterpillar is disconnected, the caterpillar wheel is impossible to carry out combat, and it takes a lot of energy to operate the caterpillar.

Thus, there is a demand on a new type of wheel that is capable of running in areas such as sand hills and swamps and simultaneously serving as a caterpillar wheel and a rubber tire.

DISCLOSURE

Technical Problem

The present disclosure is directed to providing a wheel, which may run smoothly even in harsh environments such as sand hills and swamps.

Technical Solution

In one aspect of the present disclosure, there is provided a wheel, comprising:

a body 10 having a cylindrical outer circumference;

a first ring member 21 provided at one side edge of the body 10 in the form of a protruding ring;

a second ring member 22 provided at the other side edge of the body 10 in the form of a protruding ring;

a rotation ring 30 located between the first ring member 21 and the second ring member 22 and located out of the body 10 and rotatably coupled thereto;

a plurality of pivoting plates 40 coupled to the rotation ring 30 to be pivotal outward and configured to protrude out of the rotation ring 30;

a connection member 50 located between the plurality of pivoting plates 40 to connect the first ring member 21 and the second ring member 22 and serve as a stopper for limiting a pivoting range of the pivoting plate 40;

a first opening 31 formed at the rotation ring 30 along a rotation direction of the rotation ring 30;

a second opening 11 formed at the body 10 at a position corresponding to the first opening 31;

a stopper bar 60 configured to be pivotal based on a center portion C of the body 10 and provided through the first opening 31 and the second opening 11; and a shock absorber 70 coupled to the body 10 to absorb shock when the stopper bar 60 pivots.

Advantageous Effects

The present disclosure provides a wheel, which may run smoothly even in harsh environments such as sand hills and swamps.

BEST MODE

Figure 1:
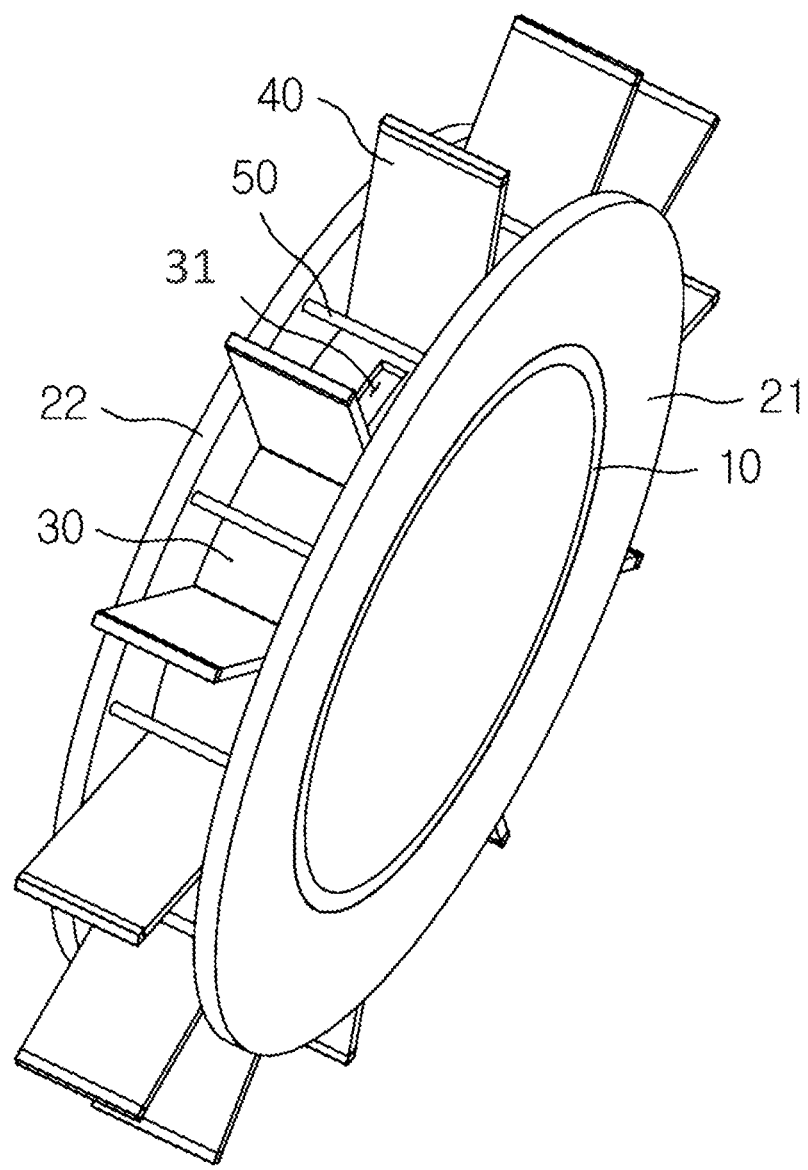
FIG. 1 is a perspective view showing a wheel according to an embodiment of the present disclosure.

In one aspect of the present disclosure, there is provided a wheel, comprising:

a body 10 having a cylindrical outer circumference;

a first ring member 21 provided at one side edge of the body 10 in the form of a protruding ring;

a second ring member 22 provided at the other side edge of the body 10 in the form of a protruding ring;

a rotation ring 30 located between the first ring member 21 and the second ring member 22 and located out of the body 10 and rotatably coupled thereto;

a plurality of pivoting plates 40 coupled to the rotation ring 30 to be pivotal outward and configured to protrude out of the rotation ring 30;

a connection member 50 located between the plurality of pivoting plates 40 to connect the first ring member 21 and the second ring member 22 and serve as a stopper for limiting a pivoting range of the pivoting plate 40;

a first opening 31 formed at the rotation ring 30 along a rotation direction of the rotation ring 30;

a second opening 11 formed at the body 10 at a position corresponding to the first opening 31;

a stopper bar 60 configured to be pivotal based on a center portion C of the body 10 and provided through the first opening 31 and the second opening 11; and a shock absorber 70 coupled to the body 10 to absorb shock when the stopper bar 60 pivots.

Embodiment

Hereinafter, preferred embodiments of the present disclosure will be described in detail with reference to the accompanying drawings. These embodiments are just for illustrations for a person having ordinary skill in the art to easily implement the present disclosure, but this does not mean that the feature and scope of the present disclosure are limited to these embodiments.

Figure 2:
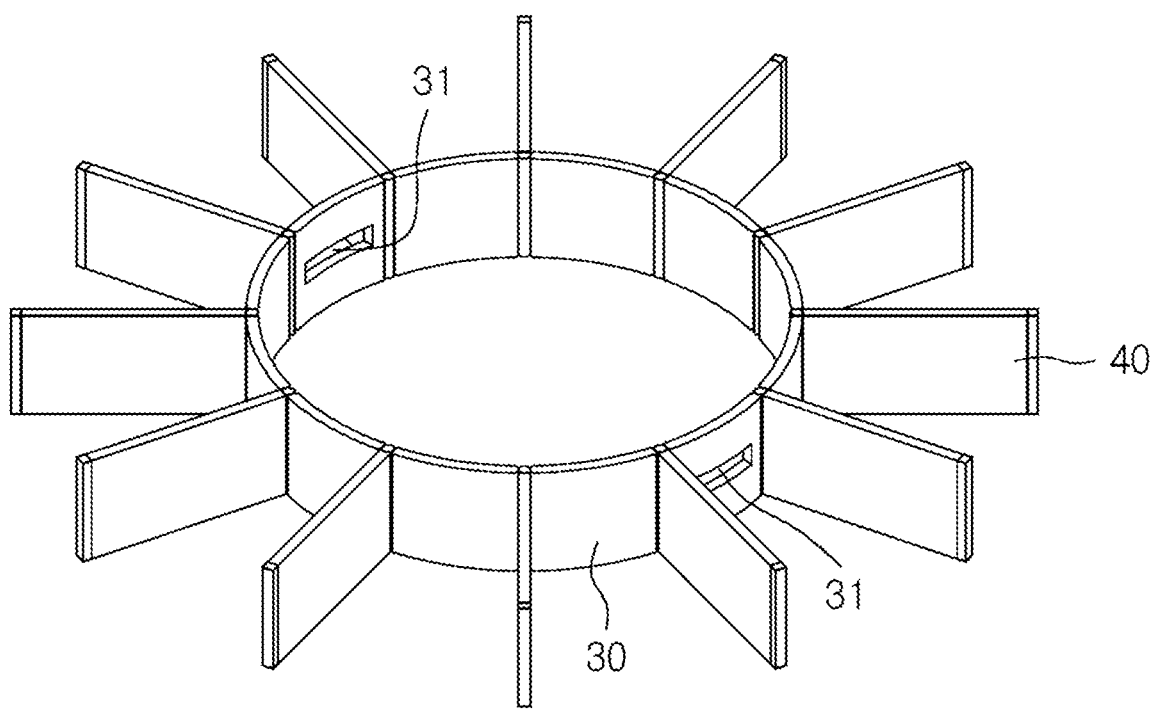
FIG. 2 is a perspective view showing a rotation ring and a pivoting plate according to an embodiment of the present disclosure.
Figure 3:
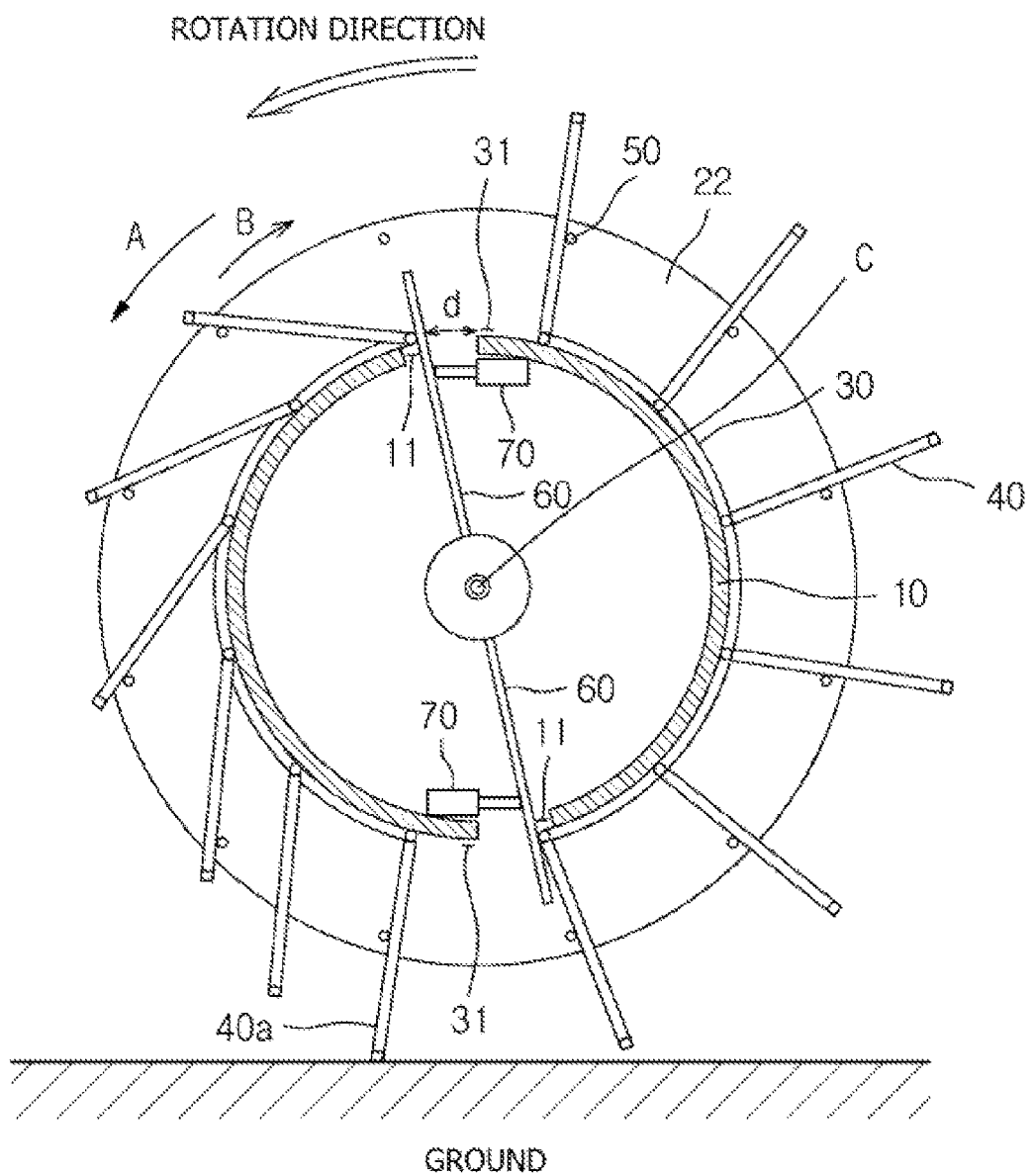
FIG. 3 is a side-sectioned view showing the wheel according to an embodiment of the present disclosure (in a forward rotation).
Figure 4:
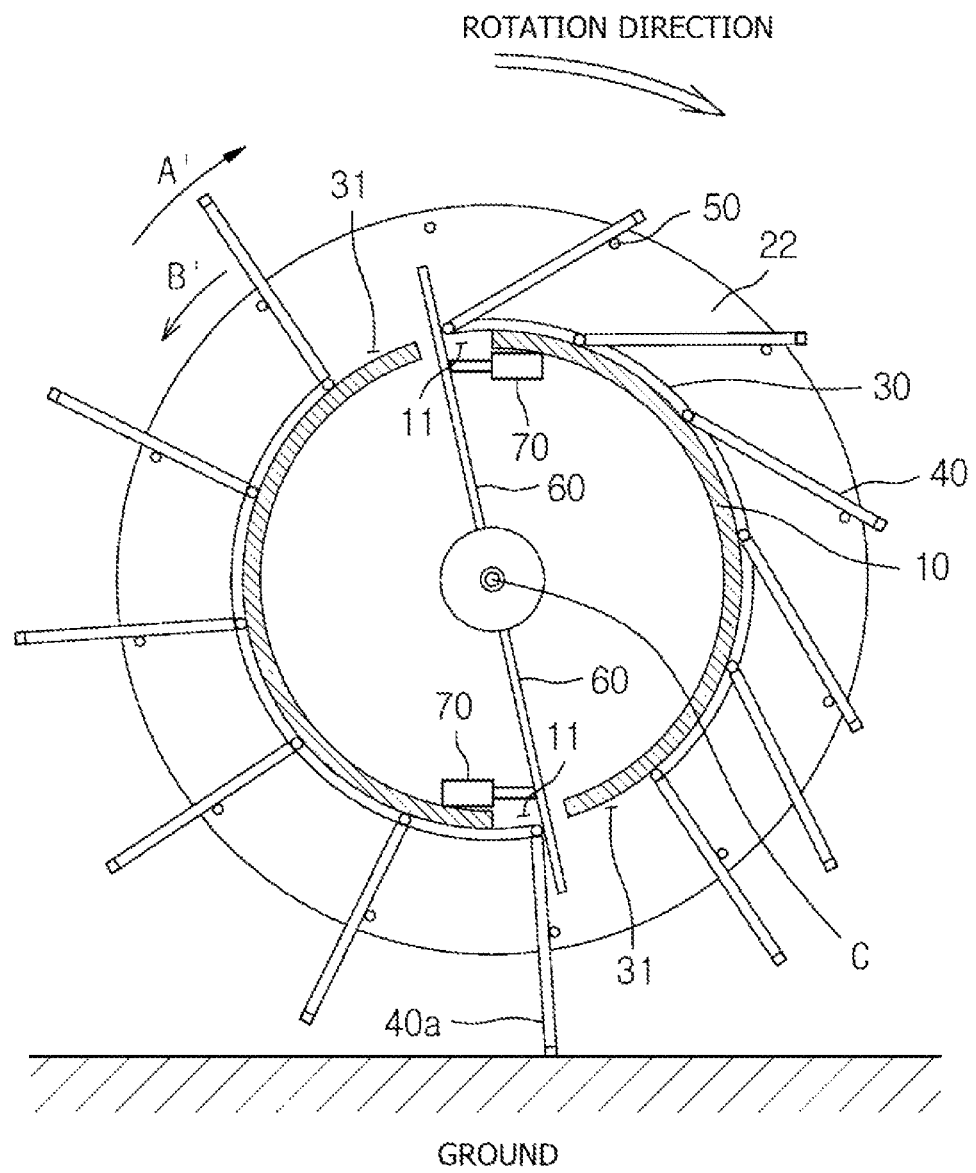
FIG. 4 is a side-sectioned view showing the wheel according to an embodiment of the present disclosure (in a rearward rotation).

FIG. 1 is a perspective view showing a wheel according to an embodiment of the present disclosure, FIG. 2 is a perspective view showing a rotation ring and a pivoting plate according to an embodiment of the present disclosure, FIG. 3 is a side-sectioned view showing the wheel according to an embodiment of the present disclosure (in a forward rotation), and FIG. 4 is a side-sectioned view showing the wheel according to an embodiment of the present disclosure (in a rearward rotation).

A wheel 100 of this embodiment includes:

a body 10 having a cylindrical outer circumference;

a first ring member 21 provided at one side edge of the body 10 in the form of a protruding ring;

a second ring member 22 provided at the other side edge of the body 10 in the form of a protruding ring;

a rotation ring 30 located between the first ring member 21 and the second ring member 22 and located out of the body 10 and rotatably coupled thereto;

a plurality of pivoting plates 40 coupled to the rotation ring 30 to be pivotal outward and configured to protrude out of the rotation ring 30;

a connection member 50 located between the plurality of pivoting plates 40 to connect the first ring member 21 and the second ring member 22 and serve as a stopper for limiting a pivoting range of the pivoting plate 40;

a first opening 31 formed at the rotation ring 30 along a rotation direction of the rotation ring 30;

a second opening 11 formed at the body 10 at a position corresponding to the first opening 31;

a stopper bar 60 configured to be pivotal based on a center portion C of the body 10 and provided through the first opening 31 and the second opening 11; and a shock absorber 70 coupled to the body 10 to absorb shock when the stopper bar 60 pivots.

The body 10 has a cylindrical outer circumference. The interior of the body 10 may further include a structure for supporting the cylindrical body 10. The outer circumference of the body 10 may be curved, but its overall shape is circular.

The first ring member 21 protrudes at one side edge of the body 10 and has a ring shape. The second ring member 22 protrudes at the other side edge of the body 10 and has a ring shape.

The rotation ring 30 is located between the first ring member 21 and the second ring member 22 and is rotatably located at the outside of the body 10.

The pivoting plate 40 is coupled to the rotation ring 30 to be pivotal outward and protrudes outward further to the rotation ring 30. The pivoting plate 40 may be provided in plurality, and the plurality of pivoting plates 40 may be coupled at equal intervals to be pivotal in the outer direction of the rotation ring 30.

If the wheel 100 rotates, the pivoting plate 40 coupled to the rotation ring 30 taps the ground. If the wheel is made of ordinary tires, the pivoting plate 40 moves while tapping the ground, even if it slides on swamp or sand. At this time, the rotation ring 30 is not rotated by the stopper bar 60, explained later, after being rotated only a predetermined angle. If the rotation ring 30 continues to rotate, the pivoting plate 40 is not able to tap and press the ground. In this embodiment, the stopper bar 60 limits a pivoting range of the pivoting plate 40.

The connection member 50 is located between the plurality of pivoting plates 40 and plays a role of connecting the first ring member 21 and the second ring member 22. The connection member 50 acts as a stopper to limit a pivoting range of the pivoting plate 40. The connection member 50 is provided in plurality, and each connection member 50 is located between the pivoting plates 40. While the rotation ring 30 coupled to the pivoting plate 40 rotates at an angle, the rotation is stopped by the stopper bar 60. The pivoting plate 40 is limited not to be tilted by the connection member 50. That is, the connection member 50 limits the pivoting range of the pivoting plate 40, and as shown in FIGS. 3 and 4, it may be found that the pivoting of the pivoting plate 40a coming into contact with the ground is limited by the connection member 50.

A first opening 31 is formed at the rotation ring 30 along a rotation direction of the rotation ring 30. In addition, a second opening 11 is formed at the body 10 at a position corresponding to the first opening 31.

The stopper bar 60 is rotatable within a limited range based on a center portion C of the body 10. The stopper bar 60 is provided through the first opening 31 and the second opening 11.

If the wheel 100 rotates in the forward direction, as shown in FIG. 3, the wheel 100 rotates in the same direction as the arrow A. If the rotation ring 30 rotates in the clockwise direction (in the direction of the arrow B) as the pivoting plate 40 is pressed against the ground, the rotation ring 30 rotates only as much as the distance by which the first opening 31 is formed, and the rotation ring 30 does not rotate further but stops at the stopper bar 60. If the rotation ring 30 attempts to rotate further, the rotation ring 30 stops at the stopper bar 60, and the shock absorber 70 absorbs the shock.

As shown in FIG. 4, when the wheel 100 moves rearward, the wheel rotates in the A' direction. At this time, the pivoting plate 40 comes into contact with the ground so that the rotation ring 30 rotates in the counterclockwise direction B', and the rotation ring 30 rotates as much as the distance by which the first opening 31 is formed. After that, the rotation of the rotation ring 30 is blocked by the stopper bar 60. If the rotation ring 30 attempts to move rearward further after reaching the stopper bar 60, the shock absorber 70 absorbs the shock, and the stopper bar 60 is not pushed further due to the second opening 11.

The second opening 11 is also formed at the body 10 along the rotation direction of the rotation ring 30 in a predetermined size.

The shock absorber 70 is coupled to the stopper bar 60. When the stopper bar 60 moves, the shock absorber 70 absorbs the shock. The shock absorber 70 is coupled to the body 10.

The operation structure of the wheel 100 of this embodiment will be described.

As shown in FIG. 3, if the pivoting plate 40a comes into contact with the ground, the weight of the vehicle is loaded on the pivoting plate 40a, and the pivoting plate 40a rotates the rotation ring 30 in the clockwise direction (along the arrow B). At this time, since the first opening 31 is formed at the rotation ring 30 and the stopper bar 60 protrudes from the first opening 31, the rotation ring 30 rotates in the clockwise direction as much as the size (the distance d) in which the first opening 31 is formed. The rotation of the rotation ring 30 is limited by the stopper bar 60.

While the pivoting plate 40a is pivoting, the center portion of the pivoting plate 40a is engaged with the connection member 50. As a result, pivoting plate 40a is not able to rotate further. As a result, the end of the pivoting plate 40a presses on the ground, and the vehicle may move while strongly hitting the ground. The pivoting plate 40a allows the wheel 100 not to slide on the ground in circumstances such as mud, swamp or sand. Meanwhile, when the pivoting plate 40a comes into contact with the ground, the shock is transferred to the shock absorber 70 via the rotation ring 30 and the stopper bar 60. Since the pivoting plate 40a is generally made of metal, it is recommended that the shock absorber 70 for absorbing the impact caused by the contact with the ground is coupled thereto for the comfort of the vehicle and the durability of the wheel.

If the length of the shock absorber 70 is shortened, during forward rotation, the pivoting plate 40 may be tilted forward due to the connection member 50 acting as stopper. For this reason, the angle of the pivoting plate 40 and the rotation ring 30 may change from a right angle to an acute angle, which should be adjusted. This angle is an important factor for transferring the impact of the pivoting plate 40 caused by contacting the ground to the shock absorber 70 via the rotation ring 30 and the stopper bar 60.

Meanwhile, as shown in FIG. 4, if the wheel 100 moves rearward, the rotation ring 30 rotates reversely, and the rotation ring 30 moves reversely (along the B' arrow) as much as the distance by which the first opening 31 is formed. After that, the center portion of the pivoting plate 40a is caught by the connection member 50, and the pivoting plate 40a maintains an angle enough to strongly hit the ground.

When the wheel 100 moves forward and rearward, the first opening 31 is located at an appropriate place as the pivoting plate 40a is rotated and pushed by an appropriate distance. After the pivoting plate 40a is pushed to a correct position, the connection member 50 prevents the pivoting plate 40a from pivoting. As a result, the pivoting plate 40a has an optimum angle enough to strongly hit the ground. Without the connection member 50, the pivoting plate 40a is leaned back so that the wheel 100 is not able to exert thrust. If the first opening 31 is not formed by a predetermined distance, the pivoting plate 40 may be located at an optimal position during forward movement, but may not be located at an optimal position during rearward movement. Accordingly, the first opening 31 allows the rotation ring 30 to rotate forward and rearward by a predetermined distance so that the pivoting plate 40 is located at an optimal position enough to strongly hit the ground.

The second opening 11 is formed so that the stopper bar 60 may move by a predetermined distance. The stopper bar 60 is coupled to the shock absorber 70. Thus, if the stopper bar 60 moves, the shock absorber 70 absorbs the shock.

The embodiments of the present disclosure have been described in detail. However, the embodiments are just for illustrations and not intended to limit the scope of the appended claims. Many changes, modifications and equivalents can be made thereto by those having ordinary skill in the art, and such changes, modifications and equivalents also fall within the scope of the present disclosure.

INDUSTRIAL APPLICABILITY

The present disclosure may be used in vehicle fields, particularly for military equipment.

What is claimed is:

1. A wheel, comprising:
    a body having a cylindrical outer circumference;
    a first ring member provided at one side edge of the body in the form of a protruding ring;
    a second ring member provided at the other side edge of the body in the form of a protruding ring;
    a rotation ring located between the first ring member and the second ring member and located radially outward from the body and rotatably coupled thereto;
    a plurality of pivoting plates coupled to the rotation ring to be pivotal outward and configured to protrude out of the rotation ring;
    a connection member located between the plurality of pivoting plates to connect the first ring member and the second ring member and serve as a stopper for limiting a pivoting range of the pivoting plate;
    a first opening formed in the rotation ring along a rotation direction of the rotation ring;
    a second opening formed in the body at a position corresponding to the first opening;
    a stopper bar configured to be pivotal based on a center portion of the body and provided through the first opening and the second opening; and
    a shock absorber coupled to the body to absorb shock when the stopper bar pivots.

* * * * *